(12) United States Patent
Kim

(10) Patent No.: US 12,701,387 B2
(45) Date of Patent: Aug. 4, 2026

(54) LOCATION-SPECIFIC SERVICES PROVIDED VIA SHORT-RANGE COMMUNICATIONS BETWEEN BUSINESS BEACONS AND USER DEVICES ON A TELECOMMUNICATIONS NETWORK

(71) Applicant: T-Mobile USA, Inc., Bellevue, WA (US)

(72) Inventor: Joohyung Kim, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 423 days.

(21) Appl. No.: 18/355,362

(22) Filed: Jul. 19, 2023

(65) Prior Publication Data

US 2025/0031010 A1     Jan. 23, 2025

(51) Int. Cl.
| | |
|---|---|
| *H04W 4/021* | (2018.01) |
| *H04W 4/80* | (2018.01) |
| *H04W 8/18* | (2009.01) |
| *H04W 12/00* | (2021.01) |
| *H04W 12/72* | (2021.01) |

(52) U.S. Cl.
CPC ............. *H04W 4/021* (2013.01); *H04W 4/80* (2018.02); *H04W 8/18* (2013.01); *H04W 12/009* (2019.01); *H04W 12/72* (2021.01)

(58) Field of Classification Search
CPC ......... H04W 4/80; H04W 4/02; H04W 4/023; H04W 4/029; H04W 4/06; H04W 4/021; H04W 12/009; H04W 12/72; H04W 8/18
See application file for complete search history.

(56) References Cited

U.S. PATENT DOCUMENTS

| | | | |
|---|---|---|---|
| 5,886,984 | A | 3/1999 | Abu-amara et al. |
| 6,647,256 | B1 | 11/2003 | Stewen et al. |
| 6,751,657 | B1 | 6/2004 | Zothner |
| 6,836,476 | B1 | 12/2004 | Dunn et al. |
| 6,879,677 | B2 | 4/2005 | Trandal et al. |
| 7,010,002 | B2 | 3/2006 | Chow et al. |
| 7,103,351 | B2 | 9/2006 | Chaudhari et al. |

(Continued)

FOREIGN PATENT DOCUMENTS

| | | |
|---|---|---|
| CN | 101594276 B | 10/2011 |
| CN | 1902877 B | 2/2014 |

(Continued)

*Primary Examiner* — Dung Hong
(74) *Attorney, Agent, or Firm* — Perkins Coie LLP

(57) ABSTRACT

A non-transitory, computer-readable storage medium storing instructions that, when executed, cause a system to enable a location-based service. The location-based service is associated with a business subscriber of the telecommunications network and is based on input from a user subscriber of the telecommunications network. The system receives a first indication that the user device is at a first location based on a first signal strength of a beacon signal broadcast at a business site by a beacon of the business subscriber. The system causes the user device to present a first content based on the first location. The system receives a second indication that the user device is at a second location based on a second signal strength of the beacon signal. The system causes the user device to present a second content that is different from the first content and is based on the second location.

17 Claims, 4 Drawing Sheets

(56) References Cited

U.S. PATENT DOCUMENTS

| | | | |
|---|---|---|---|
| 7,116,985 B2 | 10/2006 | Wilson et al. | |
| 7,127,261 B2 | 10/2006 | Van | |
| 7,181,529 B2 | 2/2007 | Bhatia et al. | |
| 7,532,899 B2 | 5/2009 | Wilson et al. | |
| 7,865,547 B2 | 1/2011 | Wuerfel et al. | |
| 7,962,633 B1 | 6/2011 | Sidebottom et al. | |
| 7,970,648 B2 | 6/2011 | Gailey et al. | |
| 7,970,868 B2 | 6/2011 | Garg et al. | |
| 8,165,561 B2 | 4/2012 | Cai et al. | |
| 8,554,626 B2 | 10/2013 | Pulijala et al. | |
| 8,762,488 B2 | 6/2014 | Swenson et al. | |
| 8,825,019 B2 | 9/2014 | Kho et al. | |
| 9,325,750 B2 | 4/2016 | Kumar | |
| 9,361,630 B1* | 6/2016 | Goswami | H04W 4/021 |
| 9,380,170 B1 | 6/2016 | Kateley et al. | |
| 9,565,297 B2 | 2/2017 | Maes | |
| 9,697,489 B2 | 7/2017 | Nayak et al. | |
| 9,824,371 B2 | 11/2017 | Kramer et al. | |
| 9,972,004 B1 | 5/2018 | Donavalli et al. | |
| 10,009,868 B1* | 6/2018 | Reyes | G06Q 30/0261 |
| 10,455,354 B2 | 10/2019 | Hu | |
| 10,798,564 B2 | 10/2020 | Namiranian | |
| 11,030,550 B2 | 6/2021 | Barrett et al. | |
| 11,622,245 B2 | 4/2023 | Garg et al. | |
| 11,682,043 B2* | 6/2023 | Snyder | G06Q 30/0261 |
| | | | 705/14.58 |
| 11,887,416 B2* | 1/2024 | Hoyer | G07C 9/00182 |
| 2002/0037709 A1 | 3/2002 | Bhatia et al. | |
| 2002/0037722 A1 | 3/2002 | Hussain et al. | |
| 2002/0038362 A1 | 3/2002 | Bhatia et al. | |
| 2003/0133549 A1 | 7/2003 | Virag et al. | |
| 2003/0216958 A1 | 11/2003 | Register et al. | |
| 2005/0164704 A1 | 7/2005 | Winsor | |
| 2007/0265006 A1 | 11/2007 | Washok et al. | |
| 2008/0089504 A1 | 4/2008 | Veenstra | |
| 2008/0109317 A1 | 5/2008 | Singh | |
| 2009/0299788 A1 | 12/2009 | Huber et al. | |
| 2011/0202443 A1 | 8/2011 | Martin | |
| 2013/0226704 A1* | 8/2013 | Fernandez | G06Q 30/0267 |
| | | | 705/14.58 |
| 2014/0136312 A1* | 5/2014 | Saksena | G06Q 30/0261 |
| | | | 709/224 |
| 2014/0236793 A1 | 8/2014 | Matthews et al. | |
| 2014/0365304 A1* | 12/2014 | Showers | G06Q 30/0261 |
| | | | 705/14.55 |
| 2015/0242924 A1 | 8/2015 | Lott et al. | |
| 2015/0289207 A1* | 10/2015 | Kubo | H04W 4/029 |
| | | | 370/311 |
| 2016/0012517 A1* | 1/2016 | Woo | G06Q 30/0261 |
| | | | 705/26.9 |
| 2016/0066123 A1* | 3/2016 | Ko | H04B 17/318 |
| | | | 455/41.1 |
| 2016/0140671 A1 | 5/2016 | Hong | |
| 2016/0189132 A1* | 6/2016 | Cash | G06Q 20/322 |
| | | | 705/14.57 |
| 2016/0203518 A1 | 7/2016 | Horvath | |
| 2016/0227359 A1* | 8/2016 | Hurewitz | G06Q 30/0261 |
| 2016/0321702 A1 | 11/2016 | Lerman et al. | |
| 2017/0111763 A1* | 4/2017 | Morgan | A61B 3/0041 |
| 2017/0206558 A1* | 7/2017 | Ookuma | G06Q 30/0261 |
| 2023/0093566 A1* | 3/2023 | Chatterton | G06Q 20/3224 |
| | | | 705/5 |

FOREIGN PATENT DOCUMENTS

| | | | | |
|---|---|---|---|---|
| CN | 103793833 B | | 6/2017 | |
| CN | 108564394 A | * | 9/2018 | G09F 27/00 |
| EP | 1259943 A2 | | 11/2002 | |
| EP | 1446755 A2 | | 8/2004 | |
| EP | 1474750 A2 | | 11/2004 | |
| EP | 1267524 B1 | | 4/2008 | |
| EP | 3229500 A1 | * | 10/2017 | G01S 1/04 |
| JP | 2008500666 A | | 1/2008 | |
| JP | 3163259 U | | 9/2010 | |
| JP | WO2009022568 | | 11/2010 | |
| JP | 5628850 B2 | | 10/2014 | |
| JP | 7223685 B2 | | 2/2023 | |
| KR | 100365884 B1 | | 12/2002 | |
| KR | 100465246 B1 | | 1/2005 | |
| KR | 100808773 B1 | | 3/2008 | |
| KR | 20100057014 A | * | 5/2010 | G06F 16/9537 |
| KR | 101456948 B1 | | 11/2014 | |
| KR | 101650182 B1 | * | 8/2016 | H04W 4/06 |
| KR | 20170040114 A | * | 4/2017 | G06Q 50/10 |
| KR | 20170131119 A | * | 11/2017 | G06Q 30/0259 |
| KR | 101893466 B1 | * | 8/2018 | G06Q 30/0244 |
| WO | 0201405 A1 | | 1/2002 | |
| WO | 2005111928 A2 | | 11/2005 | |
| WO | 2007068986 A2 | | 6/2007 | |
| WO | 2008041942 A1 | | 4/2008 | |
| WO | 2008071115 A1 | | 6/2008 | |
| WO | 2011005217 A2 | | 1/2011 | |
| WO | 2013151529 A2 | | 10/2013 | |
| WO | 2015159131 A1 | | 10/2015 | |
| WO | 2020148658 A2 | | 7/2020 | |

* cited by examiner

LOCATION-SPECIFIC SERVICES PROVIDED VIA SHORT-RANGE COMMUNICATIONS BETWEEN BUSINESS BEACONS AND USER DEVICES ON A TELECOMMUNICATIONS NETWORK

BACKGROUND

Bluetooth is a short-range wireless technology standard used for exchanging data between fixed and mobile devices over short distances and building personal area networks. In the most widely used mode, transmission power is limited to 2.5 milliwatts, giving Bluetooth a very short range of up to 10 meters (33 feet). The technology employs UHF radio waves in the ISM bands, from 2.402 GHz to 2.48 GHz. It is mainly used as an alternative to wire connections, to exchange files between nearby portable devices and connect cell phones and music players with wireless headphones.

A beacon is typically a small Bluetooth radio transmitter. Beacons are similar to lighthouses in functionality. These small hardware devices transmit Bluetooth Low Energy (BLE) signals. Beacons could be deployed on storefronts and at real estate properties, amusement parks, event arenas, and other public venues to broadcast contextually relevant advertisements and notifications. Bluetooth-enabled smartphones are capable of scanning and displaying these signals.

BRIEF DESCRIPTION OF THE DRAWINGS

Detailed descriptions of implementations of the present technology will be described and explained through the use of the accompanying drawings.

Figure 1:
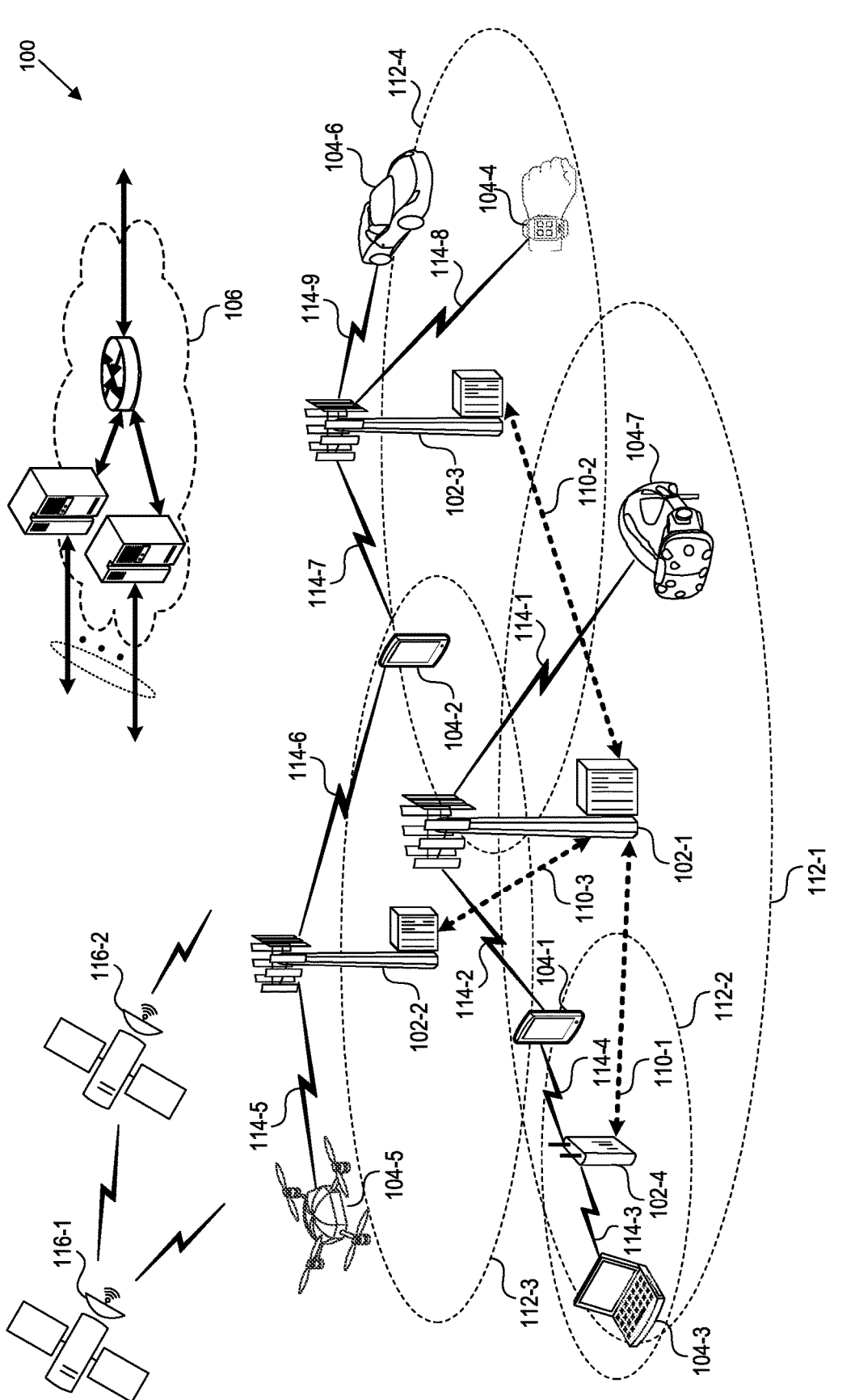
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the technology are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to connecting users with a non-business subscription to a telecommunications network with entities who have a business subscription to the same telecommunications network. Such connections include linking user devices with businesses via business beacons that provide the user devices with location-specific services over short-range communications. An example business beacon can be a router that includes a short-range radio device that broadcasts the services or indications thereof to the user device. The short-range radio device can follow a Bluetooth protocol, or a Bluetooth Low Energy (BLE) protocol, in order to pair with compatible user devices (e.g., mobile devices, laptops, tablets).

The technology enables business owners to provide enhanced location-based services to subscribers of a telecommunications network. The services can vary depending on the user's location at or near a business site. The locations of the subscribers are determined based on a distance of the subscriber from the beacon at the business site, or based on other relevant metadata provided to the user device from the beacon, or from the user device to the network. Such distances can be determined according to a strength of a signal broadcast by the beacon. The telecommunications network provides the local connectivity services (e.g., Wi-Fi) for the business and the connectivity services (e.g., cellular) for the users. A service of the telecommunications network can exchange data with the beacon and/or the subscribers to provide the enhanced location-based services. For example, a subscriber can opt in to the enhanced services such that whenever the subscriber is pinged by a beacon of a subscribed business owner, the subscriber can automatically authorize content presented on the user device from the subscribed business owner. Moreover, the content can change as the subscriber moves about the business site, based on the relative distance to the beacon. For example, the subscriber's user device can present greetings information when the user device enters a business site and receive location-specific marketing material depending on whether the user is located in the business site. In contrast, a subscriber to a different telecommunications network may need to affirmatively authorize receiving content when the subscriber's user device is at the business site.

For example, existing methods of location-based services use Wi-Fi signals to establish local connections between business and non-business users. These connections are difficult to secure and rely on cumbersome authentication protocols that prevent automatic, frictionless notifications and transactions. These transactions are most beneficial for business users seeking to reach potential customers who are just a short distance away and are interested in sales and other local services provided by the business users, but are not aware of them. The disclosed technology addresses many of these drawbacks with systems and methods for creating location-specific communications using short-range radio signals between business users and non-business users on a common telecommunications network.

The technology can include backend communications with the telecommunications network in order to enhance the operation of the business beacon and the user device. For example, the business beacon can establish the short-range connection to the user device while communicating data about that connection to a service provider of the telecommunications network, over the telecommunications network. Alternatively, or additionally, the user device can communicate such data received from short-range communications to the service provider, where the data can be further processed by machine learning services running on cloud-hosted resources, for the purpose for creating better interactions between business and non-business users.

The description and associated drawings are illustrative examples and are not to be construed as limiting. This disclosure provides certain details for a thorough understanding and enabling description of these examples. One skilled in the relevant technology will understand, however, that the technology can be practiced without many of these details. Likewise, one skilled in the relevant technology will understand that the technology can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node that can also be referred to as a cell site, a base transceiver station, or a radio base station. The network 100 can include any combination of network access nodes including an access point, radio transceiver, gNodeB (gNB), NodeB, eNodeB (eNB), Home NodeB or Home eNodeB, or the like. In addition to being a wireless wide area network (WWAN) base station, a network access node can be a wireless local area network (WLAN) access point, such as an Institute of Electrical and Electronics Engineers (IEEE) 802.11 access point.

The network access nodes of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC)).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits-per-second data transmission in the era of 6G and beyond, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Location-Specific Services Based on Business Beacon Signals

Figure 2:
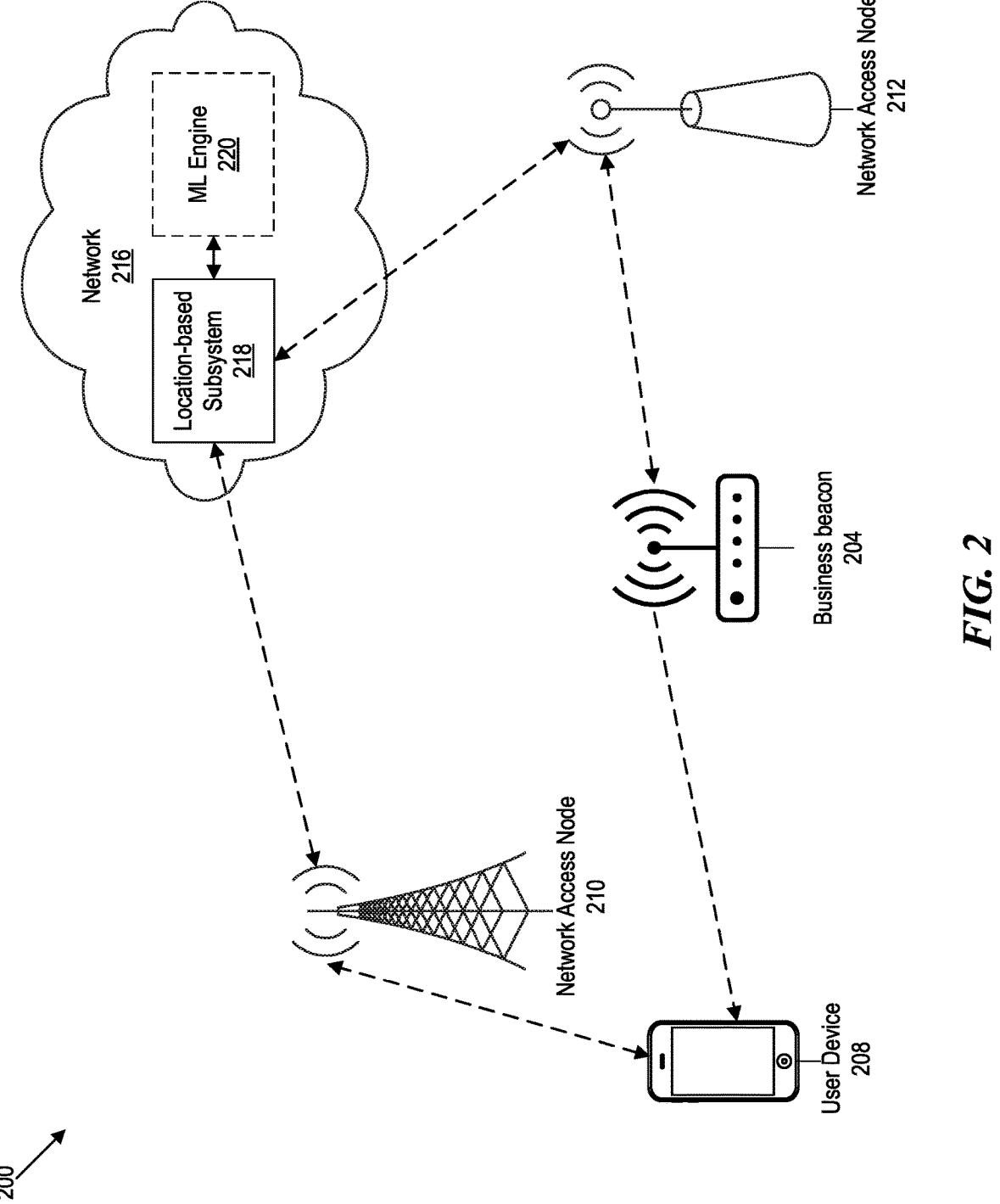
FIG. 2 is a block diagram that illustrates business beacons, user devices, and networks that can implement aspects of the present technology.

FIG. 2 is a block diagram that illustrates a system for providing location-specific services from business beacons to user devices on a telecommunications network via short-range communications. The system 200 includes a business beacon 204 associated with a business subscriber and a user device 208 associated with a user subscriber. The business subscriber has a business subscription with fees and services that are different from the non-business subscription of the user subscriber. The business subscriber has a business subscription to a telecommunications network 216, and the user subscriber has a non-business subscription to the same telecommunications network 216. The business beacon 204 can broadcast beacon signals, including location-based services, across short distances (e.g., at a business site affiliated with the business subscriber), and the user device 208 can receive the beacon signals when the user device is within range. For example, location-based services can include text, audio, video, images, games, other interactive media, or a combination of the foregoing for the purpose of engagement, promotion, branding, surveying, etc.

In the illustrated example, the network nodes include the user device 208 and network access nodes 210 and/or 212. The location-specific services obtained from the business beacon 204 can be processed by the user device 208 or by a location-based subsystem 218 hosted by a telecommunications network 216, which can be enhanced by a machine learning engine 220.

The user device 208 is separate and distinct from the business beacon 204. The user device 208 belongs to a user subscriber who has a non-business subscription to the telecommunications network 216. The user subscriber can provide an input enabling the location-based services associated with the business subscriber on the user device 208. In some embodiments, the user subscriber provides input by granting permission to a request from the location-based subsystem 218 on the user device 208 to permit the business subscriber to provide location-based services to the user device 208. In some embodiments, the user subscriber provides input by changing a setting at a network service belonging to the telecommunications network 216. The network service defines which network functions (including location-based services from business subscribers) are enabled for the user subscriber.

By enabling the location-based services, the user subscriber is enabling their user device 208 to display content associated with the business subscriber. The content displayed on the user device can vary according to the user subscriber's location at the business site. The location of the user subscriber can be determined by the system according to a signal strength of the beacon signal broadcast by the business beacon 204. For example, the user device 208 can detect the signal strength of the beacon signal, which it can use to parse the signal for a location-specific content to display, or it can use the detected signal strength to query the location-based subsystem 218 for the location-specific content, depending on various embodiments that are outlined in greater detail below.

In some embodiments, the location-based services include a network-independent service. In such an embodiment, the beacon signal includes various contents provided by the business subscriber, and the user device 208 parses the beacon signal for a location-specific slice of the content to display given the signal strength. The user device 208 can use a contents table that maps signal strength ranges to content, in order to parse the beacon signal. The contents table can be sent to the user device 208 as part of the broadcast signal, or it can be received from the telecommunications network 216 via the network access node 210 (e.g., as an update to an application associated with the telecommunications network 216 on the user device 208).

In some embodiments, the location-based services include a network-dependent service. In such an embodiment, the beacon signal includes pointers to addresses where various contents for the business subscriber are stored (e.g., physical or virtual memory addresses, and/or URLs or hyperlinks to addresses where the contents are hosted on a cloud-based service, such as the location-based subsystem 218). In such an embodiment, the location-based subsystem 218 can acquire additional user data from the user device 208 and/or the user subscription (e.g., demographic data, application usage, browser history). The additional user data can be processed, along with the signal strength of the business beacon 204, by the machine learning engine 220 to determine more location-specific or applicable content from the network location-based service to display at the user device 208. In still further embodiments, upon detecting the beacon signal, the user device can submit location data (e.g., GPS data taken from network access nodes 210 and 212 and/or satellites) to the location-based subsystem 218 for the location-specific content.

In some embodiments, an indication of the user device 208 being at a location including business site includes the user device 208 receiving the beacon signal. The indication includes an identifier of the business site, the business subscriber, or both. On receiving the indication, the user device 208 can make a comparison between the identifier and a list of trusted IDs belonging to business subscribers of the telecommunications network 216. If the identifier is on the list, the user device 208 can validate the business subscriber and retain the indication at a local memory belonging to the user device 208 for the purpose of displaying the location-specific content from the validated business subscriber. The list of trusted IDs can be accessed locally on the user device 208 (e.g., where it has been previously saved by a security update to the user device 208 from a business authorization service at the telecommunications network 216), or it can be accessed by querying the location-based subsystem 218.

In some embodiments, the indication is sent to the location-based subsystem 218, which can include the business authorization service, from the user device 208. In such embodiments, the comparison of the identifier and the list of trusted IDs, as well as the validation of the business subscriber, can occur at the network side. The telecommunications network 216 can then submit the validation to the user device 208, permitting it to present the location-specific content of the business subscriber. Additionally, in all of the foregoing embodiments, the identifier can be generated on the creation of the business subscription on behalf of the business subscriber, when it is also added to the list of trusted IDs at the business authorization service.

In some embodiments, the business beacon 204 uses low energy radio signals to broadcast the beacon signals and/or location-based services. In still further embodiments, the business beacon 204 includes a router with a short-range radio device. Additionally, the short-range radio device can follow a Bluetooth protocol or a BLE protocol.

The network nodes, including the network access nodes 210 and 212, can communicate with both the business beacon 204 (e.g., via a router attached to a Bluetooth device) and the user device 208. Beacon signal strength, user data, and location-based services—including content—can be communicated to and/or from the telecommunications network 216 through the network access nodes. Examples of the network access nodes include a macro cell, a small cell, a micro cell, a femto cell, or a pico cell. The network access node can include multiple network access nodes of varied type and service area. The network access nodes 210 and 212 are separate and distinct from the user device 208. The network access nodes are thus configured to gather user and business data and save it at the telecommunications network 216.

The location-based subsystem 218 can include one or more servers and services configured to receive, process, and store data received from one or more business beacons 204 associated with different user devices 208. The location-based subsystem 218 can include a distributed file system and/or a cloud-based database service that is configured to store the user and business data and perform further processing on the user and business data. As such, the location-based subsystem 218 can monitor multiple user devices 208 leaving or returning to business sites and locations within business sites.

The machine learning engine 220 is coupled to the location-based subsystem 218 and is configured to generate data that can be used to classify the user subscriber based on the signal strength of the beacon signal sent by the business beacon 204, along with user data, obtained from the user device 208. The machine learning engine 220 includes a model that, as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayesian estimation, clustering, reinforcement learning, probability distributions, decision trees, decision tree forests, and others. Models can be configured for various situations, data types, sources, and output formats.

In some implementations, a model can include a neural network with multiple input nodes that receive sensor/tracking data of mobile assets. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used as a prediction regarding whether a mobile asset is due for maintenance. In some implementations, such neural networks, known as deep neural networks, can have multiple layers of intermediate nodes with different configurations, can be a combination of models that receive different parts of the input and/or receive input from other parts of the deep neural network, or can be convolutions-partially using output from previous iterations of applying the model as further input to produce results for the current input.

The model can be trained with supervised learning, where the training data includes the tracking data of mobile assets as input and a desired output, such as an indication of the performance of the mobile asset or the need for maintenance. A representation of a type of mobile asset can be provided to the model. Output from the model can be compared to the desired output for that type of mobile asset and, based on the comparison, the model can be modified, such as by changing weights between nodes of the neural network or parameters of the functions used at each node in the neural network (e.g., applying a loss function). After applying each of the types of mobile assets or types of maintenance events in the training data and modifying the model in this manner, the model can be trained to evaluate new types of mobile assets or maintenance events.

Figure 3:
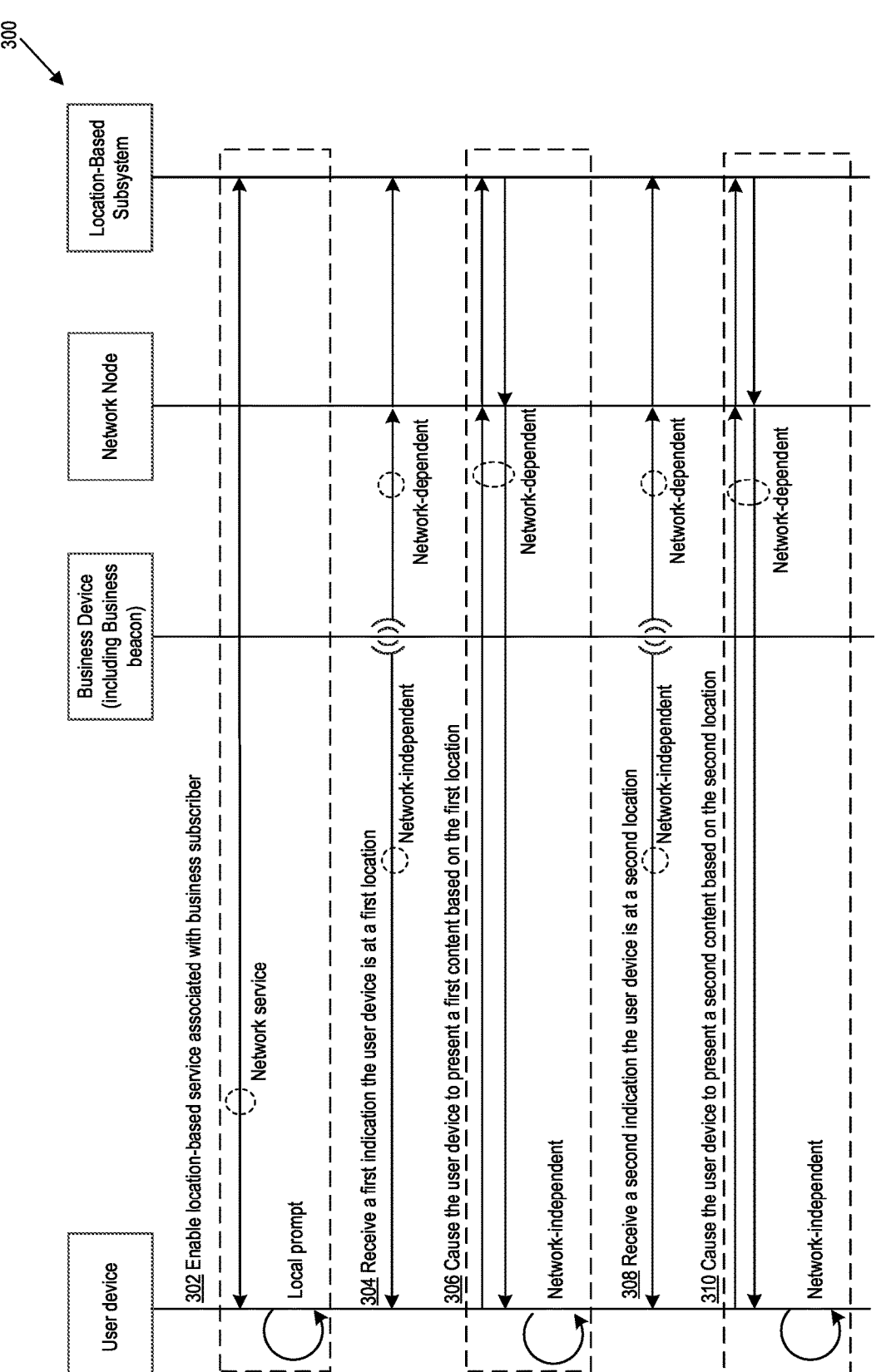
FIG. 3 is a flowchart that illustrates a method of providing location-specific services from business beacons to users via short-range communications.

FIG. 3 is a flowchart that illustrates a method 300 to provide location-specific services from business beacons to users via short-range communications. The method 300 can be performed by a system of a telecommunications network, which is configured to provide location-specific services from business beacons to users via short-range communications. In one example, the system includes at least one hardware processor and at least one non-transitory memory storing instructions that, when executed by the at least one hardware processor, cause the system to perform the method 300.

At 302, the system can enable a location-based service associated with a business subscriber of the telecommunications network, based on input from a user subscriber of the telecommunications network. This can include enabling a user device of the user subscriber to display content that varies based on signal strength measurements of beacon signals broadcast at a business site of the business subscriber. The business subscriber can have a business subscription with fees and services different from a non-business subscription of the user subscriber.

In some embodiments, enabling the location-based service occurs at the user device. In these embodiments, the user device is caused to display a prompt requesting the user subscriber to enable the location-based service. The input can be received at the user device in response to the prompt, permitting the business subscriber to provide the location-based service to the user device.

In some embodiments, enabling the location-based service occurs at a network service provided by the telecommunications network, and accessible via a network node (e.g., a location-based subsystem). The network service can receive at least an indication of the input and permit access to network functions for the non-business subscription of the user subscriber. The network functions can include location-based services from business subscribers.

At 304, the system can receive a first indication that the user device is at a first location of the business site based on a first signal strength measurement of a beacon signal broadcast at the business site by a beacon of the business subscriber. The first indication can include an identifier of the business site, the business subscriber, or both.

In some embodiments, receiving the first indication causes the system to perform a comparison between the identifier and a list of trusted IDs belonging to business subscribers. If the identifier matches at least one ID from the list of trusted IDs, the business subscriber is validated as belonging to the same telecommunications network as the user subscriber. In still further embodiments, the user device can enable updates from the telecommunications network, which can include security updates from a business authorization service. The security updates can include the list of trusted IDs belonging to the business subscribers of the telecommunications network. In yet another embodiment, prior to enabling the location-based service, the system can establish the business subscription for the business subscriber, generate the identifier, and add the identifier to the list of trusted IDs at the business authorization service.

The user device can decrypt a first content (e.g., text, image, video, and/or interactive media) from the beacon signal as a consequence of the validation, as illustrated at 306. Alternatively, the system can cause the user device to present the first content based on the identifier and the first location. Subsequently, at 308, the system can receive a second indication that the user device is at a second location of the business site based on a second signal strength measurement of the beacon signal broadcast at the business site by the beacon of the business subscriber. Finally, the system can cause the user device to present a second content based on the second location, as illustrated at 310. The second content can be different from the first content.

In some embodiments, the location-based service is a network-independent service. In these embodiments, the beacon signal comprises the first content, the second content, and a contents table that maps a signal strength range to each content provided by the network-independent service, wherein receiving an indication further causes the system to do the following: receive the beacon signal at the user device; measure a signal strength at the user device; match the signal strength to a location-specific signal strength range from the contents table in the beacon signal; parse the beacon signal broadcast for a location-specific content matching a location-specific signal strength range; and cause the user device to present the location-specific content.

In some embodiments, the location-based service is a network-dependent service. In such embodiments, the beacon signal can include a pointer to the network-dependent service hosted by the telecommunications network and running on a network-connected server, or a cloud-based service, or both. Receiving an indication in these embodiments can cause the system to receive the beacon signal at the user device and measure a signal strength at the user device. Based on the pointer, the user device can identify the network-dependent service, which can include the contents table mapping a signal strength range to each content provided by the network-dependent service. The user device can query the contents table for a location-specific content based on the signal strength, and receive the location-specific content from the network-dependent service. The location-specific content can communicate to the user device over the network node belonging to the telecommunications network, and cause the user device to present the location-specific content.

Computer System

Figure 4:
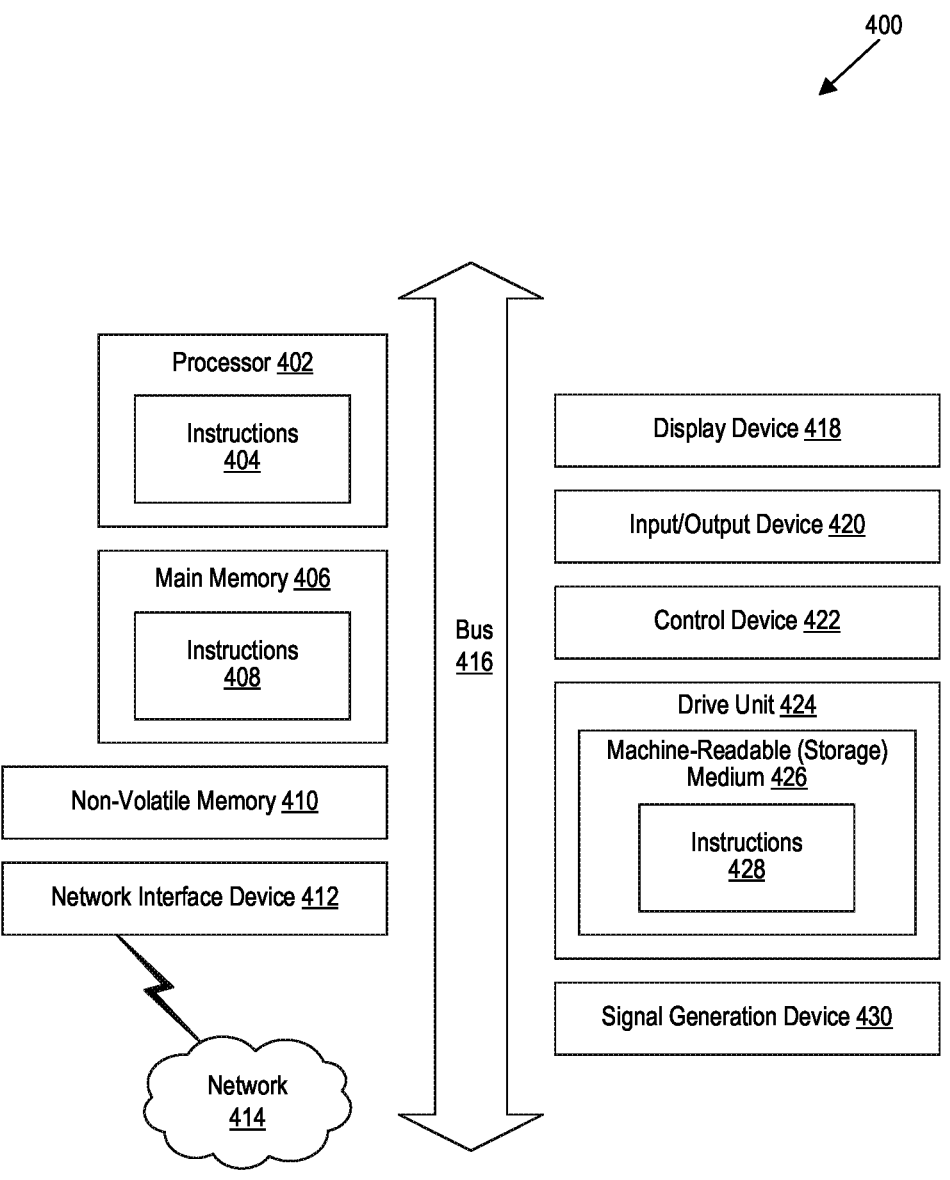
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by location-specific bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computer system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 400. In some implementations, the computer system 400 can be an embedded computer system, a system-on-chip (SOC), a single-board computer system (SBC), or a distributed system such as a mesh of computer systems, or can include one or more cloud components in one or more networks. Where location-specific, one or more computer systems 400 can perform operations in real time, in near real time, or in batch mode.

The network interface device 412 enables the computer system 400 to mediate data in a network 414 with an entity that is external to the computer system 400 through any communication protocol supported by the computer system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computer system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computer system 400 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the technology. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense-that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed herein, unless the above Detailed Description explicitly defines such terms. Accordingly, the actual scope of the technology encompasses not only the disclosed examples, but also all equivalent ways of practicing or implementing the technology under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the technology can be modified to employ the systems, functions, and concepts of the various references described above to provide yet further implementations of the technology.

To reduce the number of claims, certain implementations are presented below in certain claim forms, but the applicant contemplates various aspects of the technology in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A non-transitory, computer-readable storage medium storing instructions recorded thereon that, when executed by at least one data processor of a system of a telecommunications network, cause the system to:

enable, based on input from a user subscriber of the telecommunications network, a location-based service associated with a business subscriber of the telecommunications network, wherein a user device of the user subscriber is enabled to display content that varies based on signal strength measurements of beacon signals broadcast at a business site of the business subscriber, and wherein the business subscriber has a business subscription with fees and services different from a non-business subscription of the user subscriber;

receive a first indication that the user device is at a first location of the business site based on a first signal strength measurement of a beacon signal broadcast at the business site by a beacon of the business subscriber, wherein the first indication includes an identifier of at least one of the business site or the business subscriber;

perform a comparison between the identifier and a list of trusted IDs belonging to business subscribers of the telecommunications network;

based on a result of the comparison indicating a match between the identifier and the list of trusted IDs, validate that the business subscriber belongs to the telecommunications network of the user subscriber:

decrypt a first content from the beacon signal at the user device;

cause the user device to present a the first content based on the identifier and the first location;

receive a second indication that the user device is at a second location of the business site based on a second signal strength measurement of the beacon signal broadcast at the business site by the beacon of the business subscriber; and cause the user device to present a second content based on the second location, wherein the second content is different from the first content.

2. The non-transitory, computer-readable storage medium of claim 1, further causing the system to: enable updates from the telecommunications network at the user device; and receive a security update at the user device from a business authorization service belonging to the telecommunications network, wherein the security update includes the list of trusted IDs belonging to the business subscribers of the telecommunications network, and wherein the business authorization service provides trusted IDs belonging to the business subscribers of the telecommunications network.

3. The non-transitory, computer-readable storage medium of claim 2, further causing the system to, prior to enabling the location-based service:

establish the business subscription for the business subscriber;

generate the identifier of at least one of the business site or the business subscriber; and add the identifier to the list of trusted IDs at the business authorization service.

4. The non-transitory, computer-readable storage medium of claim 1, wherein the location-based service is a network-independent service, and wherein the beacon signal comprises the first content, the second content, and a contents table that maps a signal strength range to each content provided by the network-independent service, and wherein receiving an indication further causes the system to:

receive the beacon signal at the user device;

measure a signal strength at the user device;

match the signal strength to a location-specific signal strength range from the contents table in the beacon signal;

parse the beacon signal broadcast for a location-specific content matching the location-specific signal strength range; and cause the user device to present the location-specific content.

5. The non-transitory, computer-readable storage medium of claim 1, wherein the location-based service is a network-dependent service, and wherein the beacon signal comprises a pointer to the network-dependent service hosted by the telecommunications network and running on at least one of a network-connected server or a cloud-based service, and wherein receiving an indication further causes the system to:

receive the beacon signal broadcast at the user device;

measure a signal strength at the user device;

identify the network-dependent service based on the pointer, wherein the network-dependent service comprises a contents table that maps a signal strength range to each content provided by the network- dependent service;

query the contents table from the user device for a location-specific content based on the signal strength;

receive the location-specific content from the network-dependent service at the user device, wherein the location-specific content is communicated to the user device over the telecommunications network; and cause the user device to present the location-specific content.

6. The non-transitory, computer-readable storage medium of claim 1, wherein enabling the location-based service further causes the system to:

display a prompt at the user device to enable the location-based service, wherein the prompt is a request to permit the business subscriber to provide the location-based service to the user device; and in response to the prompt, receive the input at the user device to permit the business subscriber to provide the location-based service to the user device.

7. The non-transitory, computer-readable storage medium of claim 1, wherein enabling the location-based service further causes the system to:

receive at least an indication of the input at a network service of the telecommunications network; and permit access to network functions for the non-business subscription of the user subscriber, wherein the network functions include location-based services from business subscribers.

8. A system comprising:

at least one hardware processor; and at least one non-transitory memory storing instructions that, when executed by the at least one hardware processor, cause the system to:

enable, based on input from a user subscriber of a telecommunications network, a location-based service associated with a business subscriber of the telecommunications network, wherein a user device of the user subscriber is enabled to display content that varies based on beacon signals broadcast at a business site of the business subscriber;

receive a first indication that the user device is at a first location of the business site based on a first beacon signal broadcast at the business site by a beacon of the business subscriber, wherein the first indication includes an identifier of at least one of the business site or the business subscriber;

perform a comparison between the identifier and a list of trusted IDs belonging to business subscribers of a telecommunications network:

based on a result of the comparison indicating a match between the identifier and the list of trusted IDs, validate that the business subscriber belongs to the telecommunications network of the user subscriber:

decrypt a first content from the first beacon signal at the user device;

cause the user device to present display a-the first content based on the identifier and the first location;

receive a second indication that the user device is at a second location of the business site based on a second beacon signal at the business site broadcast by the beacon of the business subscriber; and cause the user device to present a second content based on the second location, the second content being different from the first content.

9. The system of claim 8, further causing the system to: enable updates from the telecommunications network at the user device; and receive a security update comprising the list of trusted IDs at the user device, wherein the security update is sent from a business authorization service belonging to the telecommunications network, and wherein the business authorization service provides trusted IDs belonging to the business subscribers of the telecommunications network.

10. The system of claim 9, further causing the system to, prior to enabling the location-based service:

establish a business subscription for the business subscriber;

generate the identifier of at least one of a business site or the business subscriber; and add the identifier to the list of trusted IDs at the business authorization service.

11. The system of claim 8, wherein the location-based service is a network-independent service, and wherein the first beacon signal comprises the first content, the second content, and a contents table that maps a signal strength range to each content provided by the network-independent service, and wherein receiving the first indication and receiving the second indication further causes the system to:

receive the first beacon signal at the user device;

measure a signal strength at the user device;

match the signal strength to a location-specific signal strength range from the contents table in the first beacon signal;

parse the first beacon signal for a location-specific content matching the location-specific signal strength range; and cause the user device to present the location-specific content.

12. The system of claim 8, wherein the location-based service is a network-dependent service, and wherein the first beacon signal comprises a pointer to the network-dependent service hosted by a telecommunications network and running on at least one of a network-connected server or a cloud-based service, and wherein receiving an indication further causes the system to:

receive the first beacon signal broadcast at the user device;

measure a signal strength at the user device;

identify the network-dependent service based on the pointer, wherein the network-dependent service comprises a contents table that maps a signal strength range to each content provided by the network- dependent service;

query the contents table from the user device for a location-specific content based on the signal strength;

receive the location-specific content from the network-dependent service at the user device, wherein the location-specific content is communicated to the user device over the telecommunications network; and cause the user device to present the location-specific content.

13. The system of claim 8, wherein enabling the location-based service further causes the system to:

display a prompt at the user device to enable the location-based service, wherein the prompt is a request to permit the business subscriber to provide the location-based service to the user device; and in response to the prompt, receive an input at the user device to permit the business subscriber to provide the location-based service to the user device.

14. The system of claim 8, wherein enabling the location-based service further causes the system to:

receive at least an indication of an input at a network service of a telecommunications network; and permit access to network functions for a non-business subscription of the user subscriber, wherein the network functions include location-based services from business subscribers.

15. A method comprising:

enabling, based on input from a user subscriber of a telecommunications network, a location-based service associated with a business subscriber of the telecommunications network, wherein a user device of the user subscriber is enabled to display content that varies based on signal strength measurements of beacon signals broadcast at a business site of the business subscriber;

receiving a first indication that the user device is at a first location of the business site based on a first signal strength measurement of a beacon signal broadcast at the business site by a beacon of the business subscriber, wherein the first indication includes an identifier of at least one of the business site or the business subscriber;

performing a comparison between the identifier and a list of trusted IDs belonging to business subscribers of a telecommunications network;

based on a result of the comparison indicating a match between the identifier and the list of trusted IDs, validating that the business subscriber belongs to the telecommunications network of a user subscriber;

decrypting a first content from the beacon signal at the user device; and causing the user device to present & the first content based on the identifier and the first location.

16. The method of claim 15, wherein the location-based service is a network-independent service, and wherein the beacon signal comprises the first content and a contents table that maps a signal strength range to each content provided by the network-independent service, and wherein receiving an indication further comprises:

receiving the beacon signal at the user device;

measuring a signal strength at the user device;

matching the signal strength to a location-specific signal strength range from the contents table in the beacon signal;

parsing the beacon signal broadcast for a location-specific content matching the location-specific signal strength range; and causing the user device to present the location-specific content.

17. The method of claim 15, wherein the location-based service is a network-dependent service, and wherein the beacon signal comprises a pointer to the network-dependent service hosted by a telecommunications network and running on at least one of a network-connected server or a cloud-based service, and wherein receiving an indication further comprises:

receiving the beacon signal broadcast at the user device;

measuring a signal strength at the user device;

identifying the network-dependent service based on the pointer, wherein the network-dependent service comprises a contents table that maps a signal strength range to each content provided by the network- dependent service;

querying the contents table from the user device for a location-specific content based on the signal strength;

receiving the location-specific content from the network-dependent service at the user device, wherein the location-specific content is communicated to the user device over the telecommunications network; and causing the user device to present the location-specific content.

* * * * *